(12) United States Patent
Ghosh et al.

(10) Patent No.: US 11,829,274 B1
(45) Date of Patent: Nov. 28, 2023

(54) MAINTAINING OPERATIONAL CONTINUITY OF BUSINESS SYSTEMS

(71) Applicant: Wells Fargo Bank, N.A., San Francisco, CA (US)

(72) Inventors: Parul Ghosh, Bangalore (IN); Shishir Vasant Rao, Bengaluru (IN); Niravkumar N. Bajaj, Pune (IN); Priyanka Dixit, Bangalore (IN); Arvind Kumar Gottapally, Hyderabad (IN); Abhishek Kumar, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 778 days.

(21) Appl. No.: 16/740,779

(22) Filed: Jan. 13, 2020

(51) Int. Cl.
  *G06F 11/34* (2006.01)
  *G06Q 10/0635* (2023.01)
  *G06F 11/30* (2006.01)

(52) U.S. Cl.
  CPC ...... *G06F 11/3428* (2013.01); *G06F 11/3024* (2013.01); *G06F 11/3034* (2013.01); *G06Q 10/0635* (2013.01)

(58) Field of Classification Search
  CPC ............. G06F 11/3428; G06F 11/3024; G06F 11/3034; G06Q 10/0635
  See application file for complete search history.

(56) References Cited

U.S. PATENT DOCUMENTS

| | | | |
|---|---|---|---|
| 6,601,233 B1 | 7/2003 | Underwood | |
| 8,196,207 B2 * | 6/2012 | Hill | G06Q 10/10 726/28 |
| 8,457,996 B2 | 6/2013 | Winkler et al. | |
| 8,856,936 B2 * | 10/2014 | Datta Ray | H04L 63/20 726/25 |
| 9,774,616 B2 | 9/2017 | Flores et al. | |
| 9,923,917 B2 | 3/2018 | Fausto et al. | |
| 10,044,746 B2 | 8/2018 | Vallone et al. | |
| 10,204,312 B2 | 2/2019 | Singh et al. | |
| 10,313,389 B2 | 6/2019 | Hovor et al. | |
| 10,320,828 B1 | 6/2019 | Derbeko et al. | |
| 2008/0005002 A1 | 1/2008 | Ferris | |
| 2013/0325545 A1 | 12/2013 | Mordvinova et al. | |
| 2016/0335579 A1 | 11/2016 | Anderson | |
| 2018/0025433 A1 | 1/2018 | Crabtree et al. | |
| 2018/0276372 A1 | 9/2018 | Crabtree et al. | |
| 2019/0205773 A1 | 7/2019 | Ackerman et al. | |
| 2019/0222597 A1 | 7/2019 | Crabtree et al. | |
| 2020/0143314 A1 * | 5/2020 | Bajaj | G06Q 10/0637 |

* cited by examiner

*Primary Examiner* — Elias Desta
(74) *Attorney, Agent, or Firm* — MERCHANT & GOULD P.C.

(57) ABSTRACT

An example method for monitoring operations of a business organization electronic computing device includes executing a checklist on a monitoring electronic computing device to obtain an operational status of an application being implemented on the business organization electronic computing device. Data is received from the business organization electronic computing device regarding the operational status of the application being implemented on the business organization electronic computing device. When a determination is made that the data identifies an operational threat for the business organization electronic computing device, an action is proposed or implemented to remediate the operational threat. An implementation of the checklist is adjusted based on an effectiveness of the action to remediate the operational threat.

19 Claims, 6 Drawing Sheets

MAINTAINING OPERATIONAL CONTINUITY OF BUSINESS SYSTEMS

BACKGROUND

Maintaining normal business operations can be critical for business organizations. Disruptions to business operations can result in large financial losses for the business organizations. Therefore, maintaining continuity of business operations is a high priority for many business organizations.

Business continuity management is a strategy business organizations can adopt to proactively identify potential problems relating to business operations, to minimize downtime, and to have strategies in place to recover from disruptions.

SUMMARY

Embodiments of the disclosure are directed to monitoring operations of a business organization electronic computing device. The method comprises: executing a checklist on a monitoring electronic computing device to obtain an operational status of an application being implemented on the business organization electronic computing device; receiving data from the business organization electronic computing device regarding the operational status of the application being implemented on the business organization electronic computing device; when a determination is made that the data identifies an operational threat for the business organization electronic computing device, proposing or implementing an action to remediate the operational threat; and adjusting an implementation of the checklist based on an effectiveness of the action to remediate the operational threat.

In another aspect, a method implemented on a monitoring electronic computing device for monitoring a business organization electronic computing device comprises: on the monitoring electronic computing device, receiving data from the business organization electronic computing device regarding operational aspects of the business organization electronic computing device; storing the data at the business organization electronic computing device or on a database associated with the business organization electronic computing device; periodically receiving additional data from the business organization electronic computing device regarding the operational aspects of the business organization electronic computing device; averaging the additional data with the stored data to obtain updated stored data; and designating the updated stored data as benchmark data values for the operational aspects of the business organization electronic computing device.

In yet another aspect, an electronic computing device comprises: a processor; and system memory, the system memory including instructions which, when executed by the processor, cause the electronic computing device to: implement a software checklist to obtain a value of an operational variable associated with an application being processed on a server computing device; receive the value of the operational variable from the server computing device; determine whether the value of the operational value indicates an operational threat for the server computing device; when a determination is made that the value of the operational variable indicates the operational threat, implement an action to remediate the operational threat; determine an effectiveness of the remedial action to correct the operational threat; and adjust an implementation of the software checklist based on the effectiveness of the remedial action to remediate the operational threat.

The details of one or more techniques are set forth in the accompanying drawings and the description below. Other features, objects, and advantages of these techniques will be apparent from the description, drawings, and claims.

DETAILED DESCRIPTION

The present disclosure is directed to monitoring operations of a business organization in order to proactively identify operational abnormalities of equipment such as server computing devices, databases, and networks used to implement the operations of the business organization. Operational logs of a production server computing device are monitored to detect trends in data obtained from the operational logs that could indicate deviations from benchmarks associated with this data. When deviations are detected, remedial actions can be initiated.

The remedial actions can be implemented on multiple levels. On a self-correction level, a remedial action can be implemented automatically by the production server computing device, for example by clearing a cache file. On a manual level, human intervention may be needed, for example initiating a reboot of the production server computing device. On a replacement level, a physical component may need to be replaced, such as replacing the production server computing device with a backup server computing device.

In this disclosure, the business organization for which the operations are monitored is a financial institution, such as a bank. The operations are monitored on a per application basis. Operational aspects of each application are monitored, benchmarks are determined from data derived from the operational aspects, and deviations from the benchmarks are used to trigger the remedial actions.

Example applications for the financial institution can include, without limitations, applications for processing customer requests for a mortgage, a credit card, a checking account, a personal loan, a personal line of credit, and for loans to establish and finance a business. Applications internal to the financial institution can include facilitating a transfer of bank funds overnight to one or more affiliated banks during a bank money sweep. Other applications are possible.

Example operations that can be monitored during the applications can include a frequency at which an application is accessed, a time of completion for the application, CPU utilization and memory utilization during implementation of the application, and a temperature of the CPU and other components. Memory utilization can include cache calls, requests to system memory, and database calls. Internet of things (IOT) sensors can be strategically placed to monitor the CPU and the other components to provide an early detection of things like smoke or gas that can minimize physical damage to the components. In addition, each application can access a different configuration of hardware, including a plurality of server computing devices and databases.

For each application to be monitored, the system creates a checklist for the operations to be monitored and for remedial actions to be taken when monitored data from the operations exceed predetermined benchmarks. As used in this disclosure, the checklist is a software tool comprising a plurality of software instructions. The plurality of software instructions provide for obtaining data for the operations being monitored for a respective application and for proposing or implementing a specific remedial action when the monitored data exceeds the predetermined benchmarks. The checklist can be dynamically created and modified based on trends of the monitored data over time, as discussed in more detail later herein. In an example implementation, the checklist can be a software script that can be dynamically created, stored on and run from a monitoring server computing device.

The checklist can comprise a list of operations and components to be monitored for an application. Implementation of the checklist can comprise obtaining data for the operations from operational logs, comparing the data against benchmarks, and identifying remedial actions to take for each operation when the data exceeds the benchmarks by a predetermined amount. The monitoring of each application using data obtained from operational logs provides a simulation of the business systems that can proactively detect problems in the business systems. The remedial actions can be proactively implemented to prevent or minimize downtime of the business systems and maintain operational continuity of the business systems.

The systems and methods discussed herein are directed to a computing technology that provides a technical solution for maintaining operational continuity of business systems. Business applications running on a production server computer of a business organization can be continually monitored by a monitoring server computer. Data for operational aspects of the application and the production server computer can be monitored and compared against benchmarks. Current and potential problems can be identified and remedial actions can by proactively taken. As a result, business system downtime can be minimized and operational continuity of the business systems can be maintained.

Figure 1:
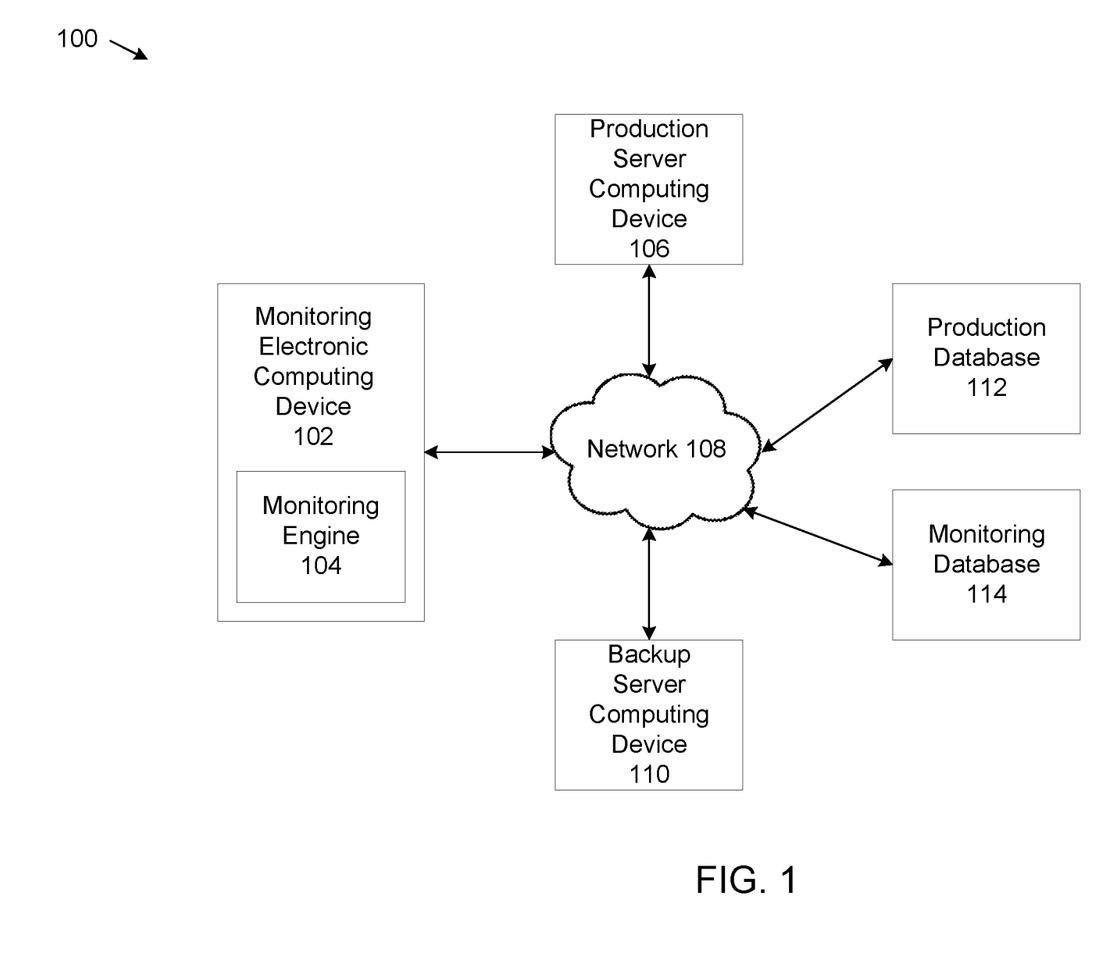
FIG. 1 shows an example system that supports maintaining operational continuity of business systems.

FIG. 1 shows an example system 100 that can support maintaining operational continuity of business systems. System 100 includes a monitoring electronic computing device 102, a production server computing device 106, a network 108, a backup server computing device 110, a production database 112, and a monitoring database 114. More, fewer, or different components are possible.

The example monitoring electronic computing device 102 is an electronic computing device, typically a server computing device, that monitors operation logs of applications running on the production server computing device 106. The monitoring electronic computing device 102 includes a monitoring engine 104.

The example monitoring engine 104 monitors the production server computing device 106 and associated databases and server computing devices for conditions that can cause a disruption to normal business operations. Monitoring comprises receiving status feeds from the production server computing device 106 and the associated databases and server computing devices on an application basis. The monitoring engine 104 analyzes operational logs and statuses of the applications and determines a threat/vulnerability score for each application. The monitoring engine 104 further generates a checklist of operations to be monitored and of proposed remedial actions to reduce any identified operational threat. The monitoring engine 104 also implements any proposed remedial action and also calculates a reliability score, indicating an effectiveness of an implemented remedial action. The monitoring engine 104 is discussed in more detail later herein.

The example production server computing device 106 is a server computing device in a financial institution, such as a bank. The production server computing device 106 processes transactions for a plurality of financial applications at the financial institution. As discussed earlier herein, the financial applications can include applying for a mortgage, opening a line of credit, etc. The production server computing device 106 can comprise a plurality of production server computing devices, including a server computer farm.

The example network 108 is a computer network and can be any type of wireless network, wired network and cellular network, including the Internet. The monitoring electronic computing device 102, the production server computing device 106, and the backup server computing device 110 can communicate with each other using network 108.

The example backup server computing device 110 is a backup production server computing device. The backup server computing device 110 can automatically be substituted for the production server computing device 106, when a remedial action calls for the production server computing device 106 to be taken out of service, as discussed later herein. System 100 can include more than one backup server computing device.

The example production database 112 is a database associated with the production server computing device 106 and with the financial organization. The production database 112 can store data for individual customers of the financial organization, including personal information, financial account information, information regarding loans, mortgages, personal lines of credit, checking and savings accounts, etc. The production database 112 can also include data for business customers of the financial organization, including assets kept at the financial organization, business lines of credit, etc. The production database 112 can also include status information for the production server computing device 106, including applications supported, and current and historical operational logs. Other information is possible.

The production database 112 can be distributed over a plurality of databases. The monitoring electronic computing device 102 can be programmed to query (e.g. using Structured Query Language, SQL) the production database 112 to obtain requested information.

The example monitoring database 114 is a database associated with the monitoring electronic computing device 102. As discussed in more detail later herein, operational data, benchmarks, checklists, and remedial actions for applications running on the production server computing device 106 can be stored on monitoring database 114.

Figure 2:
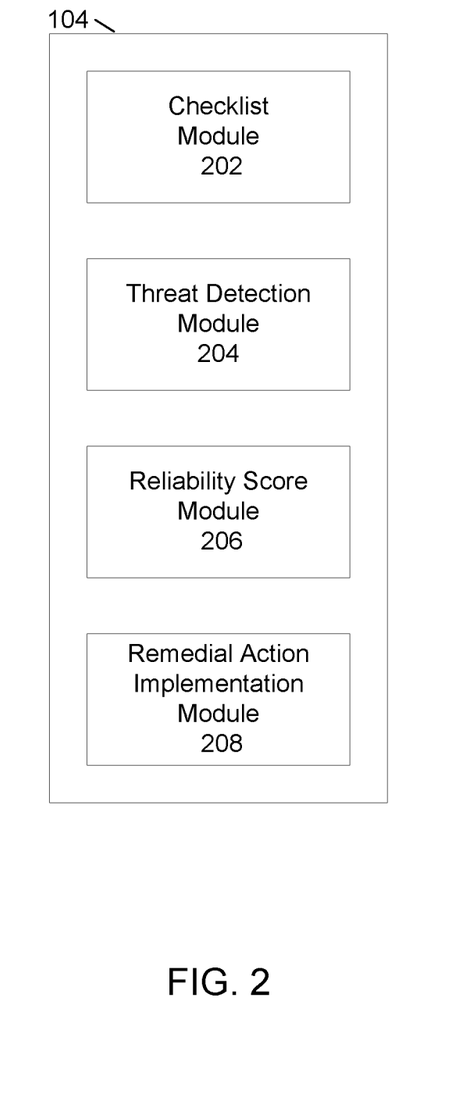
FIG. 2 shows example modules of a monitoring engine of a monitoring electronic computing device of the system of FIG. 1.

FIG. 2 shows example modules of the monitoring engine 104 of FIG. 1. The monitoring engine 104 includes a checklist module 202, a threat detection module 204, a reliability score module 206, and a remedial action implementation module 208. More, fewer, or different modules are possible.

The example checklist module 202 creates and dynamically adjusts checklists of operational variables to be monitored by the monitoring engine 104. There can be a separate checklist for each application running on the production server computing device 106. A checklist for an application can be created by observing and storing operational data of the application over a period of time, for example one year. Benchmarks for the operational data can be identified based on the observations.

For an example checklist for a loan application, the checklist module 202 can observe and store operational data, without limitation, such as a volume of loan applications over a period of time, a CPU utilization percentage during the processing of the loan application, a volume of database calls during the processing of the loan application, a volume of cache memory calls during the processing of the loan application, a percentage of cache memory used during the processing of the loan application, a percentage of disk memory used during the processing on the loan application, a temperature of the production server computing device during the processing of the loan application, and a level of smoke or gas detected in the production server computing device during the processing of the loan application.

Over time, the benchmarks can be dynamically adjusted based on additional observations over time. Then, once the benchmarks have been identified, trends in the operational data can be identified. Thresholds can be identified, such that deviations from the benchmarks above the thresholds can trigger remedial actions, as discussed in more detail later herein. The thresholds can be predetermined and can comprise a percentage above a benchmark value, for example 35 percent above the benchmark value.

The example threat detection module 204 uses checklists to monitor operational logs and status for applications running on the production server computing device 106 and for other devices that support the applications. The other devices can include the production database 112, network devices, and any additional server computing devices and databases that support the applications.

The threat detection module 204 identifies trends in data obtained from the operational logs, determines whether the trends in the data exceed benchmarks for the data, and based on an analysis of the data determines whether any remedial action needs to be taken.

The example reliability score module 206 determines a reliability score for a checklist based on how fast or seamless a recovery is made by the monitoring electronic computing device 102 while executing the remedial actions in the checklist. The reliability score indicates an effectiveness of the remedial actions specified in the checklist in correcting the threats identified by the executing the checklist. Based on the reliability score, the monitoring engine 104 may modify the remedial actions specified in the checklist and update the checklist.

The example remedial action implementation module 208 implements the remedial actions specified in the checklist when the operational items monitored for an application by checklist exceed threshold values. A type of remedial action that is to be implemented can be based on an extent to which a value of a monitored operational item deviates from a benchmark above a threshold. As stated earlier herein, the systems and method provide for three levels of remedial action—a self-correction level, in which a self-correction remedial action can be triggered, a manual level, in which manual intervention is required, and a replacement level, in which a production server computing device, or some other system device can be replaced.

A self-correction level remedial action can be implemented when the production server computing is running, without affecting the operation of the production server computing device 106. An example of a self-correction level remedial action can be an instruction issued by the monitoring electronic computing device 102 to the production server computing device 106 to clear a memory cache on the production server computing device 106.

A manual level remedial action is one in which some or all operations of the production server computing device 106 may need to be suspended while a manual intervention is implemented. An example of a manual level remedial action is rebooting the production server computing device 106.

A replacement level remedial action is one in which a hardware elements has been identified as failing or defective, and to which the hardware element needs to be replaced. For example, if the production server computing device 106 is determined to be overheating or otherwise malfunctioning, the monitoring engine can automatically replace the production server computing device 106 with the backup server computing device 110.

As discussed earlier herein, checklists are created on a per application basis. Each checklist includes instructions for monitoring operational variables that are specific to the application being monitored. In addition, some operational variables can be monitored for all applications. An example of operational variables that can be monitored for all applications can include database calls, cache memory calls, amount of cache memory used, amount of free cache memory, disk memory calls, amount of used disk memory, amount of free disk memory, a percentage of CPU utilizations, CPU temperature, and production server computing device 106 chassis temperature. More, fewer, or different of these operational variables are possible.

Some of the operational variables are monitored and obtained from operational logs and from internal statistics kept be the production server computing device 106. Operational variables such as database calls, cache memory calls, used cache memory, free cache memory, disk memory calls, free disk memory and CPU utilization can be included. Other operational variables, such as CPU temperature and chassis temperature can be obtained via sensors, such as internet of things (TOT) sensors contained within the production server computing device 106.

The following example memory schema can be used for operational variables being monitored.
  Current value—a current value of the operational variable
  High value—the highest value obtained for the operational variable
  Low value—the lowest value obtained for the operational variable
  Average value—an average of all values obtained for the operational variable
  Benchmark value—an average value for the operational variable being used as a benchmark In an example implementation, over a predetermined period of time, for example six months or one year, values for the operational variables are periodically obtained. For example, current values of cache memory calls, used cache memory and free cache memory, can be obtained on an hourly basis. Each current value can be compared with a previous high value and low value, and if the current value exceeds the previous high value or is below the previous low value, the current value becomes the high value or low value, respectively. The current value is also averaged with a previous average value to become a new average value. After the predetermined period of time has expired, for example after a six month or one year period, the average value can be designated as the benchmark value.

Once the benchmark value of an operational variable is determined, each operational variable in a checklist is continually monitored to observe any trends in deviations from the benchmark value for the operational variable. When a steady trend above or below a benchmark value is observed over time, a determination can be made whether the benchmark value for the operational variable should be adjusted. For example, if the trend shows an increase over time, followed by a plateau, the benchmark value can be adjusted to the value corresponding to the plateau. However, if the value of the operational variable exceeds a predetermined threshold, a threat situation can be indicated, and an alert for a remedial action can be generated. The alert can indicate a level of the threat and can propose a specific remedial action. As discussed earlier herein, the level of the threat can correspond to the extent to which the value of the operational variable exceeds the predetermined threshold.

As mentioned, some operational variables for a checklist can be specific to an application. For an example application for processing an application for a personal loan, the checklist can include operational variables such as requests for loan applications, approvals for loan applications, rejections for loan applications, and processing time for loan applications. More, fewer, or different operational variables can be included in the checklist for the application.

The system 100 also includes functionality for a digital dashboard that can display operational variable data. For example, the digital dashboard can comprise a graphical user interface (GUI) that can be accessed from a smartphone or other electronic computing device and which can display requested operational variable data. The digital dashboard is described in detail in a related patent application Ser. No. 16/740,824, filed on even date herewith, the entirety of which is incorporated by reference.

Figure 3:
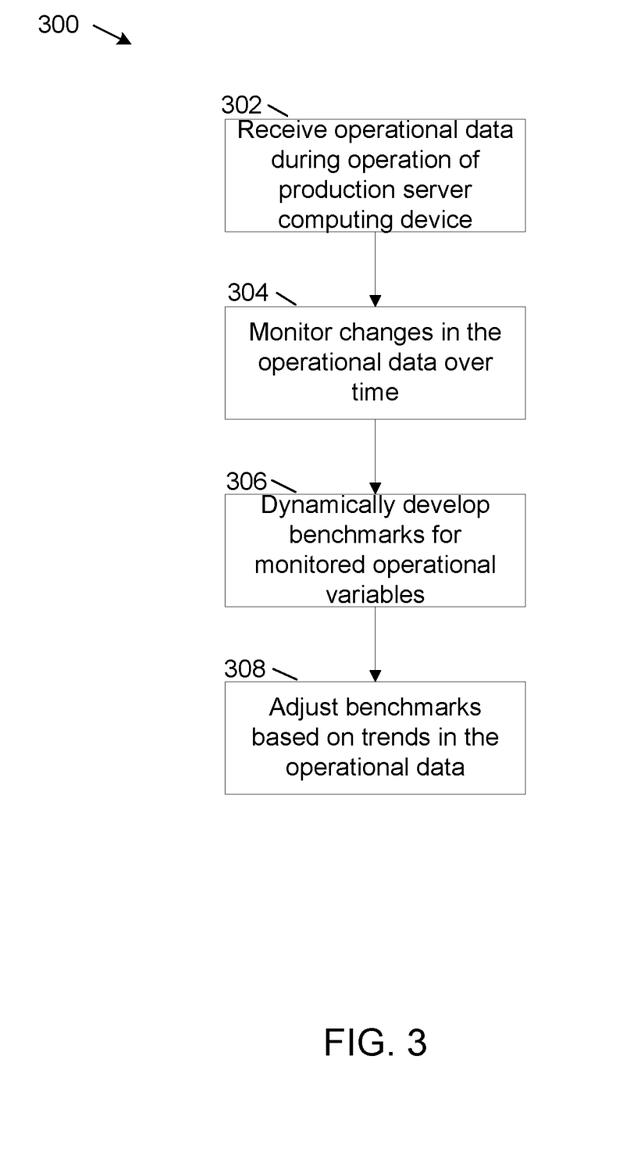
FIG. 3 shows a method for determining benchmarks for operational variables of a checklist.

FIG. 3 shows a flowchart for an example method 300 for determining benchmarks for operational variables of applications running on a production server computing device. For method 300, the production server computing device is the production server computing device 106. Data values for the operational data are obtained from an electronic computing device that monitors the production server computing device 106. For method 300, the electronic computing device is the monitoring electronic computing device 102.

At operation 302, operational data is obtained from operational logs and internal statistics for an application running on the production server computing device 106. Basic operational data that can be obtained can include operational variables such as system calls to databases, cache and disk memory, amounts of used and free cache and disk memory, and temperatures of components within the production server computing device 106. The operational variables can be included in a checklist for the application. Values of the operational data corresponding to the operational variables can be stored in memory on monitoring electronic computing device 102, or on a database associated with monitoring electronic computing device 102, for example on monitoring database 114. The operational data that can be stored for each operational variable can include a current value, a high value, a low value, and an average value.

At operation 304, the monitoring electronic computing device 102 monitors changes in the operational data over time. For example, when a current value exceeds a high value for an operational variable, the current value becomes a new high value. Similarly, when a current value is less than a low value, the current value becomes a new low value. The current value can be averaged with the average value to obtain a new average value. However, if the monitoring electronic computing device 102 determines that the current value comprises a spike that is significantly higher than the average value, the spike value can be considered to be an aberration which is not averaged with the average value. The time period for which the monitoring electronic computing device 102 monitors the operational data over time is long enough to establish benchmarks for the operational variables. Example time periods can be comprise months of time, typically six months or one year.

At operation 306, the monitoring electronic computing device 102 dynamically develops benchmarks for the operational variables being monitored. In an example implementation, once the time period has elapsed, the average value for an operational variable becomes the benchmark value for the operational variable. Then, at operation 308, as monitoring continues over time, the benchmark value for the operational variable can be dynamically increased or decreased based on trends in the operational data. For example, if the average value for an operational variable increases or decreases over time and then plateaus, the plateau value of the operational variable can become the new benchmark value for the operational variable. As discussed earlier herein, any spikes in the operational data can be identified as isolated events and not averaged into current average data and not included in the trends. In addition, if the value of the operational data is above a predetermined threshold for a benchmark, the operational data value above the benchmark can be identified as a threat, for which remedial action is warranted. The predetermined threshold is typically a percentage above the threshold, for example 35 percent.

Figure 4:
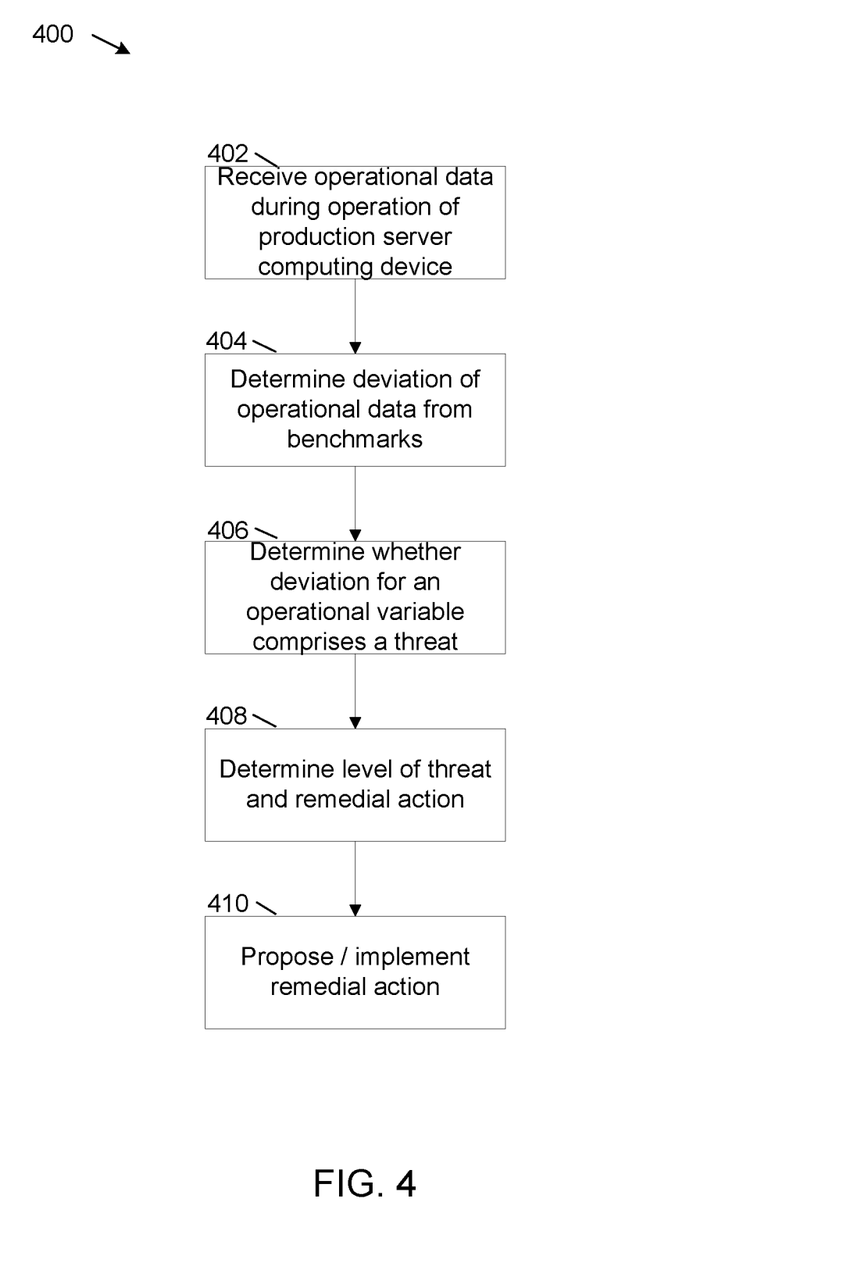
FIG. 4 shows a method for identifying a threat based upon a benchmark being exceeded.

FIG. 4 shows a flowchart for an example method 400 for identifying a threat based on a benchmark being exceeded.

At operation 402, the monitoring electronic computing device 102 receives operational data for the production server computing device 106. The operational data is obtained on a per application basis from operational logs and internal statistics accessible via the production server computing device 106. The operational data is obtained for operational variables identified in a checklist for an application running on the production server computing device 106.

At operation 404, the monitoring electronic computing device 102 determines if there are any deviations in the operational data from benchmarks for the operational variables.

At operation 406, if any deviations are identified, the monitoring electronic computing device 102 determines whether any deviation for an operational variable exceeds a predetermined threshold and is considered to be a threat to the operation of the production server computing device 106. When making this determination, the monitoring electronic computing device 102 eliminates any deviations that are identified as spikes in the operational data. In some implementations, when the deviation for the operational variable exceeds the predetermined threshold, the deviation can be considered to be a potential threat, rather than an actual threat. In these implementations, the deviation above the predetermined threshold needs to occur for a specific period of time, or a specific number of monitoring cycles, before the deviation is designated as a threat.

At operation 408, when an actual threat is designated, the monitoring electronic computing device 102 determines a level of the threat and an appropriate remedial action to deal with the threat. In an example implementation, the level of the threat is determined by an extent to which the deviation in the operational data exceeds the predetermined threshold for the benchmark. For example, a self-correction level threat can be identified when the deviation in the operational data exceeds the benchmark be 25 percent, a manual level threat can be identified when the deviation is 30%, and a replacement level threat can be identified when the deviation is 35% or greater. Other percentages can be used.

At operation 410, the monitoring electronic computing device 102 proposes or implements a remedial action, based on the level of the threat. For a self-correction level threat, the monitoring electronic computing device 102 implements a self-correction action, such as clearing a memory cache. For a manual level threat, the monitoring electronic computing device 102 proposes a manual action, such as a manual reset of the production server computing device 106. For a replacement level threat, the monitoring electronic computing device 102 implements or proposes a component replacement. For example, the monitoring electronic computing device 102 can propose that the production server computing device 106 be replaced with the backup server computing device 110. In some implementations, the backup server computing device 110 can automatically replace the production server computing device 106. For example, Internet access can be disabled on the production server computing device 106, and activated on the backup server computing device 110. In addition, the backup server computing device 110 can be assigned the same Internet address as the production server computing device 106.

Figure 5:
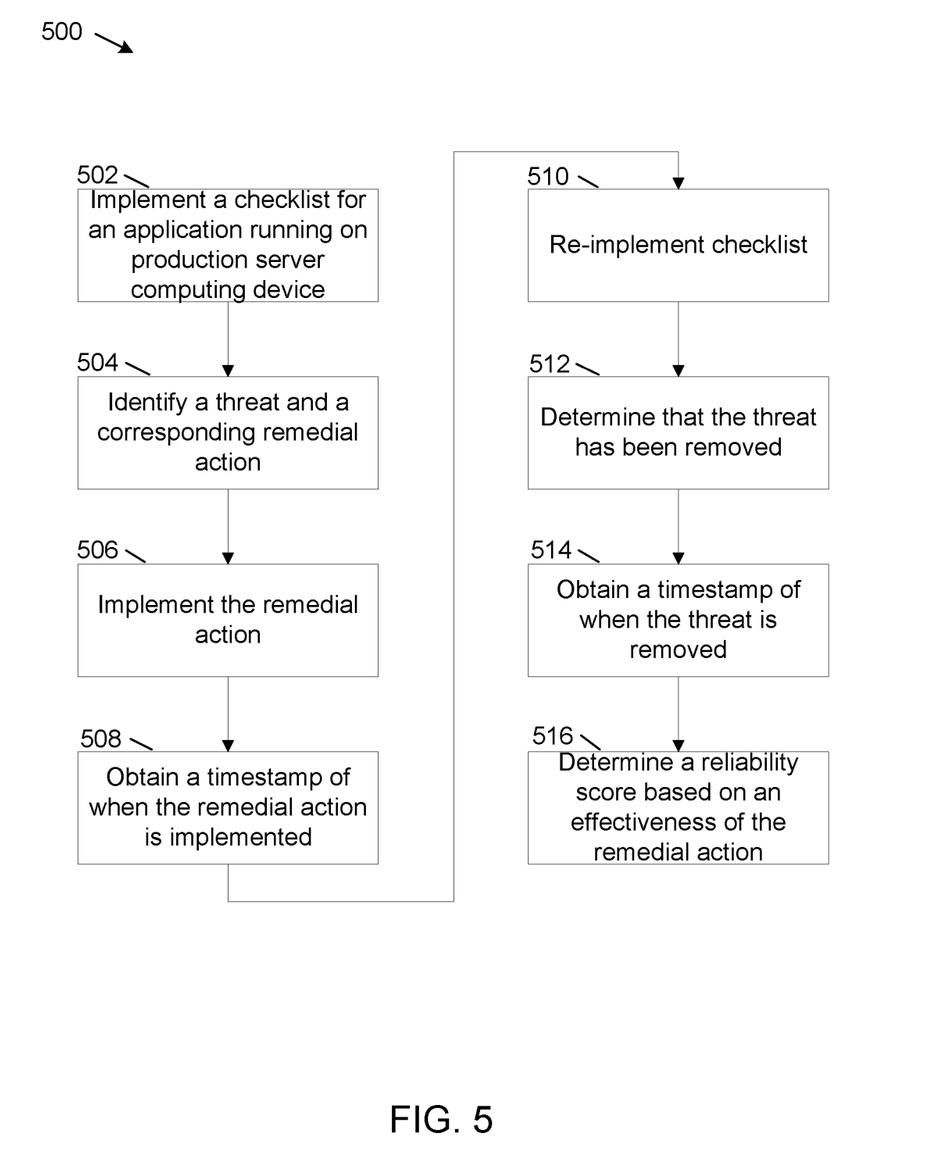
FIG. 5 shows a method for determining a reliability score of a checklist.
Figure 6:
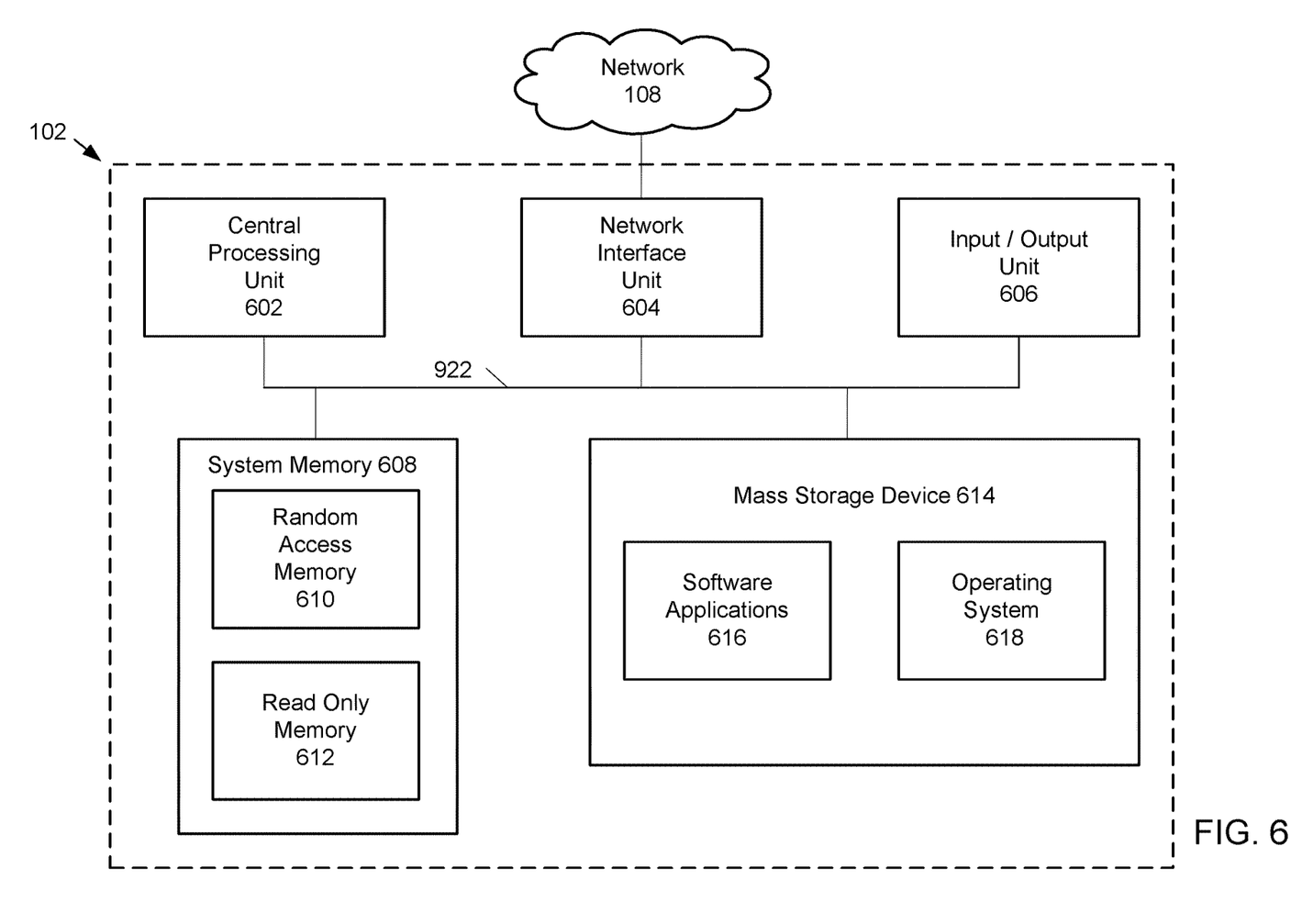
FIG. 6 shows example physical components of the monitoring electronic computing device of the system of FIG. 1.

FIG. 5 shows a flowchart for an example method 500 for determining a reliability score of a checklist. As discussed earlier herein, the reliability score for the checklist is based on how effective a remedial action is in correcting a threat identified by the checklist.

At operating 502, the monitoring electronic computing device 102 implements a checklist for an application running on the production server computing device 106.

At operation 504, as a result of implementing the checklist, the monitoring electronic computing device 102 identifies a threat and a corresponding remedial action for the production server computing device 106 to address the threat.

At operation 506, the monitoring electronic computing device 102 either implements the remedial action, for example for a self-correction level or replacement level threat, or proposes a remedial action, for example for a manual level threat.

At operation 508, the monitoring electronic computing device 102 obtains a timestamp, comprising a date and a time of day, for when the remedial action is implemented.

At operation 510, after the remedial action is implemented and the production server computing device 106 resumes normal operation, the monitoring electronic computing device 102 re-implements the checklist of operation 502.

At operation 512, the monitoring electronic computing device 102 determines that the threat identified at operation 504 has been removed. For example, the threat can be determined to be removed when the checklist is re-implemented and no threats are identified.

At operation 514, the monitoring electronic computing device 102 obtains a timestamp for when the threat is removed.

At operation 516, the monitoring electronic computing device 102 determines a reliability score based on effectiveness of the remedial action. The reliability score is based on whether the remedial action was sufficient to remove the threat, and based on the timestamps, how long it took for the threat to be removed.

As illustrated in the example of FIG. 8, monitoring electronic computing device 102 includes at least one central processing unit ("CPU") 802, also referred to as a processor, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the monitoring electronic computing device 102, such as during startup, is stored in the ROM 812. The monitoring electronic computing device 102 further includes a mass storage device 814. The mass storage device 814 is able to store software instructions and data. Some or all of the components of the monitoring electronic computing device 102 can also be included in the production server computing device 106 and the backup server computing device 110.

The mass storage device 814 is connected to the CPU 802 through a mass storage controller (not shown) connected to the system bus 822. The mass storage device 814 and its associated computer-readable data storage media provide non-volatile, non-transitory storage for the monitoring electronic computing device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the monitoring electronic computing device 102.

According to various embodiments of the invention, the monitoring electronic computing device 102 may operate in a networked environment using logical connections to remote network devices through the network 108, such as a wireless network, the Internet, or another type of network. The monitoring electronic computing device 102 may connect to the network 108 through a network interface unit 804 connected to the system bus 822. It should be appreciated that the network interface unit 804 may also be utilized to connect to other types of networks and remote computing systems. The monitoring electronic computing device 102 also includes an input/output controller 806 for receiving and processing input from a number of input devices. Similarly, the input/output controller 806 may provide output to a display screen or other type of output device.

As mentioned briefly above, the mass storage device 814 and the RAM 810 of the monitoring electronic computing device 102 can store software instructions and data. The software instructions include an operating system 818 suitable for controlling the operation of the monitoring electronic computing device 102. The mass storage device 814 and/or the RAM 810 also store software instructions and software applications 816, that when executed by the CPU 802, cause the monitoring electronic computing device 102 to provide the functionality of the monitoring electronic computing device 102 discussed in this document. For example, the mass storage device 814 and/or the RAM 810 can store software instructions that, when executed by the CPU 802, cause the monitoring electronic computing device 102 to display received data on the display screen of the monitoring electronic computing device 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for monitoring operations of a business organization electronic computing device, the method comprising:
   executing a checklist on a monitoring electronic computing device to obtain an operational status of an application being implemented on the business organization electronic computing device, wherein the checklist comprises instructions to obtain operational variables pertaining to the operational status of the application;
   receiving data from the business organization electronic computing device regarding the operational status of the application being implemented on the business organization electronic computing device, wherein the data includes one or more of the operational variables;
   simulating the business organization electronic computing device within a business system using the observed operational variables;
   determining that the one or more of the operational variables of the data identifies a potential operational threat for the business organization electronic computing device based on the simulating;
   when a determination is made that the one or more of the operational variables of the data identifies a potential operational threat for the business organization electronic computing device based on the simulating, proposing or implementing a proactive action to remediate the potential operational threat;
   adjusting an implementation of the checklist based on an effectiveness of the proactive action to remediate the potential operational threat; and
   executing the adjusted implementation of the checklist.

2. The method of claim 1, further comprising:
   obtaining one or more benchmarks for aspects of the application; and
   when the data exceeds at least one of the benchmarks by a threshold value, determining that the potential operational threat exists for the business organization electronic computing device.

3. The method of claim 2, wherein the benchmarks are dynamically determined based on historical trends of the data.

4. The method of claim 2, further comprising determining a level of the potential operational threat, the level being based on an extent to which the data exceeds the threshold value.

5. The method of claim 2, wherein each benchmark corresponds to at least one of the operational variables of the business organization electronic computing device while running the application.

6. The method of claim 5, wherein the at least one of the operational variables corresponds to a usage of memory on the business organization electronic computing device.

7. The method of claim 5, wherein the at least one of the operational variables corresponds to a temperature of an aspect of the business organization electronic computing device.

8. The method of claim 5, wherein the at least one of the operational variables corresponds to a percentage utilization of a processor of the business organization electronic computing device.

9. The method of claim 1, wherein proposing or implementing the proactive action comprises implementing a self-correction operation on the business organization electronic computing device.

10. The method of claim 1, wherein proposing or implementing the proactive action comprises automatically replacing the second electronic computing device with a replacement electronic computing device, the replacement electronic computing device having the same functionality as the business organization electronic computing device.

11. The method of claim 1, further comprising determining a reliability score for the checklist indicating how fast or seamless a recovery was made by the business organization electronic computing device while implementing the checklist.

12. A method implemented on a monitoring electronic computing device for monitoring a business organization electronic computing device, the method comprising:
   on the monitoring electronic computing device, receiving data from the business organization electronic computing device regarding operational aspects of the business organization electronic computing device;
   storing the data at the business organization electronic computing device or on a database associated with the business organization electronic computing device;
   periodically receiving additional data from the business organization electronic computing device regarding the operational aspects of the business organization electronic computing device, wherein the data includes one or more operational variables;
   averaging the additional data with the stored data to obtain updated stored data;
   simulating the business organization electronic computing device within a business system using the updated stored data;
   designating the updated stored data as benchmark data values for the operational aspects of the business organization electronic computing device based on the simulating; and
   triggering a remedial action when data received from the business organization electronic computing device deviates from the benchmark data values.

13. The method of claim 12, wherein receiving data from the business organization electronic computing device regarding the operational aspects of the business organization electronic computing device comprises obtaining data for the operational variables regarding a usage of memory on the business organization electronic computing device.

14. The method of claim 12, wherein receiving data from the business organization electronic computing device regarding the operational aspects of the business organization electronic computing device comprises obtaining data for at least one of the operational variables regarding a temperature of a processor on the business organization electronic computing device.

15. The method of claim 12, wherein receiving data from the business organization electronic computing device regarding the operational aspects of the business organization electronic computing device comprises obtaining data for at least one of the operational variables regarding a percentage utilization of a processor on the business organization electronic computing device.

16. The method of claim 12, wherein periodically receiving the additional data comprises periodically receiving the additional data over a time period, and further comprising:
at an expiration of the time period, designating the updated stored data for the operational aspects of the business organization electronic computing device as the benchmark data values for the operational aspects.

17. The method of claim 12, wherein after the benchmark data values are designated:
continuing to periodically receive additional data from the business organization electronic computing device;
identifying an upward trend in the received additional data for at least one operational aspect of the business organization electronic computing device;
identifying a plateau in the upward trend in the received additional data for the at least one operational aspect of the business organization electronic computing device; and
changing a benchmark value for the at least one operational aspect to a data value corresponding to the plateau in the upward trend for the at least one operational aspect.

18. The method of claim 12, further comprising: based on the benchmark data values, dynamically creating at least a portion of a checklist for monitoring the operational aspects of the second electronic computing device, the checklist including instructions to obtain the operational variables of the business organization electronic computing device associated with the benchmark data values, the checklist permitting the monitoring electronic computing device to receive data corresponding to the operational variables and compare the data to the benchmark data values.

19. An electronic computing device, comprising:
a processor; and
system memory, the system memory including instructions which, when executed by the processor, cause the electronic computing device to:
implement a software checklist to obtain a value of at least one operational variable associated with an application being processed on a server computing device, wherein the checklist comprises instructions to obtain the value of the operational variable, the at least one operational variable pertaining to an operational status of the application;
receive the value of the at least one operational variable from the server computing device;
simulate the business organization electronic computing device within a business system using the at least one operational variable;
determine whether the value of the at least one operational value indicates an operational threat for the server computing device based on the simulated business organization electronic computing device;
when a determination is made that the value of the at least one operational variable indicates the operational threat, implement an action to remediate the operational threat;
determine an effectiveness of the remedial action to correct the operational threat;
adjust an implementation of the software checklist based on the effectiveness of the remedial action to remediate the operational threat; and
execute the adjusted implementation of the checklist.

\* \* \* \* \*